(12) United States Patent
Nakajima et al.

(10) Patent No.: US 7,026,392 B2
(45) Date of Patent: Apr. 11, 2006

(54) RESIN FOR PIGMENT DISPERSION

(75) Inventors: Yoshio Nakajima, Yokohama (JP);
Yoshiyuki Yukawa, Hiratsuka (JP);
Isao Kamimori, Hiratsuka (JP);
Akihiko Yamanouchi, Hiratsuka (JP);
Yuko Hoshida, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 275 days.

(21) Appl. No.: 10/149,676

(22) PCT Filed: Oct. 12, 2001

(86) PCT No.: PCT/JP01/08972

§ 371 (c)(1),
(2), (4) Date: Jun. 13, 2002

(87) PCT Pub. No.: WO02/31010

PCT Pub. Date: Apr. 18, 2002

(65) Prior Publication Data

US 2003/0125414 A1    Jul. 3, 2003

(30) Foreign Application Priority Data

Oct. 13, 2000  (JP) .............................. 2000-314381
Mar. 22, 2001  (JP) .............................. 2001-082740

(51) Int. Cl.
*C08L 39/00* (2006.01)
*C08L 33/02* (2006.01)
*C08L 33/14* (2006.01)
*C08L 71/02* (2006.01)
*C09D 11/10* (2006.01)

(52) U.S. Cl. ...................... 524/555; 524/556; 524/558; 524/612; 523/160

(58) Field of Classification Search ................ 523/160, 523/161; 106/31.27, 31.6; 524/555, 556, 524/558, 609, 612; 526/287, 310, 317.1, 526/332, 387
See application file for complete search history.

(56) References Cited

U.S. PATENT DOCUMENTS

| 3,896,072 | A | * | 7/1975 | Tummler et al. ............ 524/747 |
| 5,231,131 | A |   | 7/1993 | Chu et al. |
| 5,349,036 | A |   | 9/1994 | Simpson et al. |
| 5,530,056 | A | * | 6/1996 | Farwaha et al. ............. 524/558 |
| 5,698,628 | A | * | 12/1997 | Masuda et al. ............. 524/806 |
| 5,736,606 | A |   | 4/1998 | Yanagi et al. |
| 5,910,532 | A | * | 6/1999 | Schmidt et al. ............. 524/556 |
| 6,368,397 | B1 | * | 4/2002 | Ichizawa et al. ......... 106/31.65 |
| 6,413,306 | B1 | * | 7/2002 | Kraiter et al. ............ 106/31.85 |
| 6,541,538 | B1 | * | 4/2003 | Matzinger et al. .......... 523/160 |
| 2003/0055146 | A1 | * | 3/2003 | Chang et al. ................ 524/434 |
| 2003/0209695 | A1 | * | 11/2003 | Tsuzuki et al. .......... 252/363.5 |

FOREIGN PATENT DOCUMENTS

| EP | 372546 | 6/1990 |
| EP | 567214 | 10/1993 |
| EP | 798320 | 10/1997 |
| GB | 2322863 | 3/1998 |
| JP | 50-154328 | 12/1975 |
| JP | 61204034 A * | 9/1986 |
| JP | 1-182304 | 7/1989 |
| JP | 3-239709 | 10/1991 |
| JP | 7-90218 | 4/1995 |
| JP | 7-252395 | 10/1995 |
| JP | 7-316240 | 12/1995 |
| JP | 9-78056 | 3/1997 |
| JP | 9-255728 | 9/1997 |
| JP | 9-267034 | 10/1997 |
| JP | 9-272721 | 10/1997 |
| JP | 10-30010 | 2/1998 |
| JP | 10-139999 | 5/1998 |
| JP | 11-130999 | 5/1999 |
| JP | 11-197485 | 7/1999 |
| JP | 11-228897 | 8/1999 |
| JP | 2000-7734 | 1/2000 |
| JP | 2000-95992 | 4/2000 |
| JP | 2000-204281 | 7/2000 |
| JP | 2000-336292 | 12/2000 |

OTHER PUBLICATIONS

Machine Translation 07090218 A (1995).*
Machine Translation 2000-336292 A (2000).*
Machine Translation JP 2000-007734 A (2000).*
Machine Translation JP 09272721 A (1997).*

* cited by examiner

*Primary Examiner*—Callie Shosho
(74) *Attorney, Agent, or Firm*—Wenderoth, Lind & Ponack, L.L.P.

(57) ABSTRACT

This invention relates to the use of a copolymer of polymerizable unsaturated monomer containing at least one kind of ionic functional group selected from the group consisting of quaternary ammonium salt group and sulfonic acid group, nonionic polymerizable unsaturated monomer having polyoxyalkylene chain, and other ethylenically unsaturated monomer, as a pigment dispersing resin for water-based paint or water-based ink.

17 Claims, No Drawings

RESIN FOR PIGMENT DISPERSION

TECHNICAL FIELD

This invention relates to a pigment dispersing resin which is suitably used for water-based paint or water-based ink, and to aqueous pigment dispersions containing said pigment dispersing resin which are especially suitable as water-based top-coating paint for automobile and as ink-jet ink.

BACKGROUND ART

As top-coating paint for automotive finish, there have heretofore been used those of solvent-based type in which a base resin (base polymer) component such as acrylic resin, polyester resin or alkyd resin having such functional groups as hydroxyl group and carboxyl group is used together with a curing agent such as amino resin, optionally-blocked polyisocyanate compound and epoxy compound.

For the protection of terrestrial environment, paint of low volatile organic matter content (VOC) has been demanded in these years. In the field of paint for automotive finish, colored base coating paint in particular has high discharge of VOC. It has therefore been strongly required to switch colored base coating paint to water-based type. It is now expected that, in future, solvent-based coating type will be replaced with water-based coating type.

Problems incidental to the switching of colored base coating paint to water-based type are, for example: (1) pigment dispersing resin blended in water-based paint is incompatible with the binder component in water-based paint; (2) pigment dispersing resin or dispersant fails to uniformly disperse the pigment, and invites flocculation or agglomeration of pigment; and (3) pigment dispersing resin or dispersant in the water-based paint composition fails to cure under baking, and invites the degradation of coating film performance.

Pigments which are used for colored base coating paint generally have hydrophobic surfaces, and are difficult to be wetted with water, while pigment dispersing resins which have conventionally been used for solvent-based colored paint have low solubility in water, and are inferior in dispersing stability in aqueous media. Hence, it is important in designing a pigment dispersing resin for water-based paint to secure satisfactory levels of both wettability of pigment and dispersing stability of pigment dispersing resin in an aqueous medium.

Besides, pigment is now being substituting for dye as a color material for ink, in particular ink-jet ink, from the viewpoint of water resistance and weatherability. However, water-based pigment ink is still unsatisfactory in the print density of printed image. Besides, pigment has a problem that, when its dispersion stability is low, clogging occurs in head when it is used for ink-jet ink. Hence, high-level pigment wettability and pigment dispersion stability are required of said water-based pigment ink.

Low viscosity and low molecular weight of pigment dispersing resin are considered advantageous for wetting property of pigment; and easy formation of steric repelling layer on the pigment surfaces or good solubility of the pigment dispersing resin in the continuous phase (aqueous medium) are considered advantageous for the dispersing stability. Both the pigment-wetting property and the dispersing stability of the pigment dispersing resin are considered to participate in wetting of the pigment surface with the pigment dispersing resin (a resin having a group capable of forming weak flocculation in aqueous system such as alkyl-group is effective) and in adsorption onto the pigment, which are attributable to the interaction between hydrophobic part on the pigment surface and that of pigment dispersing resin.

Past development of pigment dispersing resins or assistant for water-based paint or water-based ink has been advanced based on the foregoing viewpoints. For instance, Japanese Patent Application Laid-Open No. 154328/1975 proposed use of a straight chain anionic polymer containing acidic functional groups which is obtained through polymerization of a monomer mixture containing as a part of its monomer components an acidic functional group-containing, polymerizable unsaturated monomer such as (meth)acrylic acid, as the pigment dispersing resin. Said polymer, however, exhibits high solubility in aqueous media and hence is unsatisfactory in respect of dispersion stability of pigment dispersions. Furthermore, pigment dispersions formed with the use of said polymer show excessively high viscosity and are subject to a drawback of difficult handling.

Japanese Patent Application Laid-Open No. 182304/1989, Japanese Patent Application Laid-Open No. 316240/1995 and Japanese Patent Application Laid-Open No. 502097/1998 disclosed, as the pigment dispersing resin, a graft copolymer obtained through copolymerization of carboxyl-containing macromonomers. Said graft copolymer excels in pigment dispersing stability because its trunk portion is hydrophobic and the branch portion is hydrophilic whereas pigment dispersions formed with the use of said copolymer show high viscosity, and the graft copolymer is far from being satisfactory in view of the increasing demand for pigment dispersions having high pigment concentration to save cost and to reduce VOC.

Japanese Patent Application Laid-Open No. 255728/1997, Japanese Patent Application Laid-Open No. 267034/1997 and Japanese Patent Publication No. 19201/1996 disclose an idea of using, as pigment dispersing agent, a nonionic surfactant having polyoxyalkylene chain. Although capable of existing stably in water-based pigment dispersions, said surfactant is unsatisfactory in adsorption to pigment, and is in particular poor in let-down stability, and, moreover, inferior in the appearance of resultant coating film.

On the other hand, top-coating paint for automotive finish are now required to have not only film performance such as high durability, acid resistance, washability (scratch resistance) and chipping resistance, but also still better appearance of coating film in sharpness, transparency, color development, and the like, than before.

An object of the present invention is to provide pigment dispersing resins which excel in wetting property and dispersing stability even at high pigment concentration, and which can provide aqueous pigment dispersions having low viscosity, excellent in color developing property and giving a coating film with good appearance.

A further object of the present invention is to provide a water-based pigment dispersion which has low viscosity and which excels in color-developing property.

Another object of the invention is to provide a water-based paint which excels in curability and which is capable of forming a painted film of splendid finish appearance in sharpness, transparency and color-developing property and weatherability.

Another object of the invention is to provide a water-based ink composition which excels in sharpness, transparency, color-developing property and weatherability.

Other objects and characteristics of the invention will become apparent from the following descriptions.

DISCLOSURE OF INVENTION

After assiduous study to achieve the above-mentioned objectives, the inventors of this invention have found out that a pigment dispersing resin which is obtained by copolymerizing a monomer having hydrophilic functional group which is a certain kind of ionic group, a nonionic hydrophilic monomer having polyoxyethylene chain and the like, and other ethylenically unsaturated monomers in the presence of radical polymerization initiator is quite suitable as a pigment dispersing resin for water-based paint or water-based ink.

This invention provides a pigment dispersing resin which is a copolymer of:
(A) polymerizable unsaturated monomer containing at least one kind of ionic functional group selected from the group consisting of quaternary ammonium base and sulfonic acid group;
(B) nonionic polymerizable unsaturated monomer having polyoxyalkylene chain; and
(C) other ethylenically unsaturated monomer.

This invention also provides an aqueous pigment dispersion which comprises the above-mentioned pigment dispersing resin, pigment, aqueous medium and, if necessary, dispersion adjuvant as well.

This invention further provides a water-based paint composition and a water-based ink composition each of which comprises the above-mentioned aqueous pigment dispersion.

The following is a further detailed explanation about pigment dispersing resin, aqueous pigment dispersion, water-based paint composition and water-based ink composition of this invention.

Pigment Dispersing Resin

The pigment dispersing resin which is provided by this invention is a copolymer of (A) an ionic functional group-containing polymerizable unsaturated monomer, (B) a nonionic polymerizable unsaturated monomer, and (C) other ethylenically unsaturated monomer, as follows.

Ionic Functional Group-containing Polymerizable Unsaturated Monomer (A):

Monomer (A) is a monomeric component by which to introduce a specific ionic functional group into a pigment dispersing resin. For this monomer (A), there is employed a polymerizable unsaturated monomer having at least one kind of ionic functional group which is selected from quaternary ammonium salt group and sulfonic acid group.

Specific examples of monomer (A) include quaternary ammonium salt group-containing polymerizable unsaturated monomers like: (meth)acryloyloxyalkyl trialkylammonium salt groups such as 2-(methacryloyloxy)ethyl trimethylammonium chloride, 2-(methacryloyloxy)ethyl trimethylammonium bromide and 2-(methacryloyloxy)ethyl trimethylammonium dimethylphosphate; (meth)acryloylaminoalkyltrialkyl ammonium salt groups such as (meth)acryloylaminopropyl trimethylammonium chloride and (meth)acryloylaminopropyl trimethylammonium bromide; tetraalkyl(meth)acrylate such as tetrabutylammonium (meth)acrylate; and trialkylbenzylammonium (meth)acrylate such as trimethylbenzylammonium (meth)acrylate; and sulfonic acid group-containing polymerizable unsaturated monomers like: (meth)acrylamide-alkanesulfonic acid such as 2-acrylamide-2-methylpropanesulfonic acid; and sulfoalkyl(meth)acrylate such as 2-sulfoethyl(meth)acrylate. These monomers may be used either singly or in combination of two or more. Among the above-mentioned monomers, 2-(methacryloyloxy)ethyltrimethylammonium chloride and 2-acrylamide-2-methylpropanesulfonic acid are particularly suitable as polymerizable unsaturated monomer (A).

The above-mentioned quaternary ammonium salt group-containing polymerizable unsaturated monomer may be used together with tertiary amino group-containing polymerizable unsaturated monomer. For example, 2-(methacryloyloxy)ethyltrimethylammonium chloride is preferably used together with N,N-dimethylaminoethyl (meth)acrylate and/or N,N-diethylaminoethyl (meth)acrylate, which can broaden the range of pigment to which the pigment dispersing resin of this invention is applicable.

Examples of tertiary amino group-containing polymerizable unsaturated monomer which can be used together include N,N-dialkylaminoalkyl (meth)acrylates such as N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate and N,N-dimethylaminobutyl (meth)acrylate; and N,N-dialkylaminoalkyl (meth)acrylamides such as N,N-dimethylaminoethyl (meth)acrylamide, N,N-diethylaminoethyl (meth)acrylamide and N,N-dimethylaminopropyl (meth)acrylamide;

In the case of said combined use, the weight ratio of (a) quaternary ammonium salt group-containing polymerizable unsaturated monomer to (b) tertiary amino group-containing polymerizable unsaturated monomer is usually in a range of 10/1 to 1/20, especially 5/1 to 1/10.

When quaternary ammonium salt group-containing polymerizable unsaturated monomer is used as monomer (A), quaternary ammonium salt group which is introduced into resin acts effectively especially for the sake of dispersibility of acidic pigment or neutral pigment. When, on the other hand, sulfonic acid group-containing polymerizable unsaturated monomer is used as monomer (A), sulfonic group which is introduced into resin acts effectively especially for the sake of dispersibility of basic pigment.

Nonionic Polymerizable Unsaturated Monomer (B) Containing Polyoxyalkylene Chain:

Monomer (B) is a monomeric component which gives hydrophilicity to the formed copolymer, and which contains polyoxyalkylene chain and polymerizable unsaturated monomer in molecule. Examples of said polyoxyalkylene chain include polyoxyethylene chain, polyoxypropylene chain and polyoxyethylene-polyoxypropylene block chain.

Polyoxyalkylene chain has preferably a molecular weight in a range of 200 to 3,000, in particular 300 to 2,500.

Typical example of monomer (B) is represented by compounds of the following formula (1):

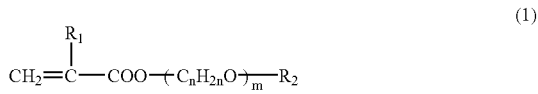

(1)

in which
$R_1$ stands for hydrogen or $CH_3$,
$R_2$ stands for hydrogen or $C_1$ to $C_4$ alkyl group,
m is an integer of 4–60, in particular 6–50, and
n is an integer of 2–3, preferably 2, and
oxyalkylene units ($C_nH_{2n}O$) in the number of m may be the same or different from each other.

Specific examples of such monomer (B) are as follows: tetraethylene glycol (meth)acrylate, methoxytetraethylene glycol (meth)acrylate, ethoxytetraethylene glycol (meth)acrylate, n-butoxytetraethylene glycol (meth)acrylate, tetrapropylene glycol (meth)acrylate, methoxytetrapropylene glycol (meth)acrylate, ethoxytetrapropylene glycol (meth)acrylate, n-butoxytetrapropylene glycol (meth)acrylate, polyethylene glycol (meth)acrylate, polypropylene glycol (meth)acrylate, methoxypolyethylene glycol (meth)acrylate and ethoxypolyethylene glycol (meth)acrylate, among which polyethylene glycol (meth)acrylate and polypropylene glycol (meth)acrylate are particularly suitable.

These monomers may be used either singly or in combination of two or more.

Other Ethylenically Unsaturated Monomer (C):

Other ethylenically unsaturated monomer (C) is a polymerizable unsaturated monomer other than the above monomers (A) and (B), which is copolymerizable with said monomers (A) and (B), and is suitably selected according to properties required of pigment dispersing resins.

Concrete examples of such monomer (C) include $C_1$ to $C_{24}$ straight chain- or cyclic-alkyl (meth)acrylate monomer such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, n-octyl (meth)acrylate, lauryl (meth)acrylate, stearyl (meth)acrylate, cyclohexyl (meth)acrylate, isobornyl (meth)acrylate and tridecyl (meth)acrylate; hydroxyl group-containing polymerizable unsaturated monomer (typically hydroxyalkyl (meth)acrylate monomer) such as 2-hydroxyethyl (meth)acrylate, hydroxypropyl (meth)acrylate and hydroxybutyl (meth)acrylate; carboxyl group-containing polymerizable unsaturated monomer such as methacrylic acid and acrylic acid; acrylamide and (meth)acrylamide; oxetane ring-containing (meth)acrylates such as 3-ethyl-3-(meth)acryloyloxymethyl oxetane, 3-methyl-3-(meth)acryloyloxymethyl oxetane and 3-butyl-3-(meth)acryloyloxymethyl oxetane; aromatic vinyl compounds such as styrene, α-methyl styrene and vinyl toluene; (meth)acrylonitrile; and vinyl acetate. These polymerizable unsaturated monomers may be used either singly or in combination of two or more.

The pigment dispersing resin which is provided by the present invention is used, for example, for the preparation of colored water-based base coating paint. Hence, the pigment dispersing resin of the present invention desirably reacts with curing agent component, e.g., amino resins or optionally-blocked polyisocyanate compounds, to be incorporated into the crosslinked paint film, for the sake of favorable paint film performance. Therefore, monomer (C) desirably contains a hydroxyl group-containing polymerizable unsaturated monomer at least as a part of its component.

When used for water-based ink, monomer (C) desirably contains a hydroxyl group-containing polymerizable unsaturated monomer at least as a part of its component from a viewpoint of wettability to printed surface, spreadability of ink and reactivity with the above-mentioned curing agent component, and the like.

Specific examples of such hydroxyl group-containing polymerizable unsaturated monomer include monoesters between polyhydric alcohols and (meth)acrylic acid such as 2-hydroxyethyl (meth)acrylate, hydroxypropyl (meth)acrylate, 2,3-dihydroxybutyl (meth)acrylate, 4-hydroxybutyl (meth)acrylate, polyethylene glycol mono(meth)acrylate and the like; and compounds formed by ring-opening polymerization of said monoesters of polyhydric alcohols and (meth)acrylic acid, with ε-caprolactone. In particular, 4-hydroxybutyl (meth)acrylate, polyethylene glycol mono(meth) acrylate and compounds formed by ring-opening polymerization of said monoesters of polyhydric alcohols and acrylic or methacrylic acid, with ε-caprolactone, show favorable reactivity. The above-recited compounds may be used either singly or in combination of two or more.

The use rate of the hydroxyl group-containing polymerizable unsaturated monomers is normally 3–30% by weight, in particular 5–25% by weight, based on the total weight of the monomers (A), (B) and (C).

The pigment dispersing resin of this invention is intended to be used chiefly for aqueous system. With a view to keeping the water dispersibility of said resin, there may be used, in addition to the above-mentioned monomer (B), carboxyl group-containing polymerizable unsaturated monomer at least as a part of the above-mentioned other ethylenically unsaturated monomer (C), if necessary.

Pigment Dispersing Resin

The pigment dispersing resin of this invention is produced by the copolymerization of ionic functional group-containing polymerizable unsaturated monomer (A), nonionic polymerizable unsaturated monomer (B) and other ethylenically unsaturated monomer (C). The proportion of monomers (A), (B) and (C) in copolymerization is not strictly restricted, but may be varied depending on the physical property required of formed copolymer, and the like. Generally, however, the proportion may be set in the following range on the basis of the total weight of monomers (A), (B) and (C):

Monomer (A): 1 to 15% by weight, preferably 2 to 10% by weight, much more desirably 3 to 8% by weight;

Monomer (B): 5 to 40% by weight, preferably 7 to 35% by weight, much more desirably 10 to 30% by weight;

Monomer (C): 45 to 94% by weight, preferably 55 to 91% by weight, much more desirably 62 to 87% by weight.

The copolymerization of monomers (A), (B) and (C) may be conducted by any known method, for instance, by solution polymerization in an organic solvent, emulsion polymerization in water, or the like, among which solution polymerization is suitable. In an example of copolymerization by solution polymerization, a mixture of the above-mentioned monomers (A), (B) and (C) and a radical polymerization initiator is dissolved or dispersed in an organic solvent, and heated for polymerization at a temperature of about 80° C. to about 200° C. with stirring for 1 to 10 hours.

Examples of organic solvent which is usable for copolymerization include hydrocarbon solvents such as heptane, toluene, xylene, octane and mineral spirit; ester solvents such as ethyl acetate, n-butyl acetate, isobutyl acetate, ethylene glycol monomethylether acetate and diethylene glycol monobutylether acetate; ketone solvents such as methyl ethyl ketone, methyl isobutyl ketone, diusobutyl ketone and cyclohexanone; alcohol solvents such as methanol, ethanol, isopropanol, n-butanol, sec-butanol and isobutanol; ether solvents such as n-butyl ether, dioxane, ethylene glycol monomethyl ether and ethylene glycol monoethyl ether and the like; and aromatic petroleum solvents such as Swasol™ 310, Swasol™ 1000 and Swasol™ 1500 of Cosmo Oil Co., Ltd. These organic solvents can be used either singly or in combination of two or more. At the time of (co-)polymerization, the organic solvent is normally used in an amount not more than 400 parts by weight based on 100 parts by weight of the monomer components to be (co-)polymerized.

Examples of the above-mentioned radical polymerization initiator include organic peroxide polymerization initiators like ketone peroxides such as cyclohexanone peroxide, 3,3,5-trimethylcyclohexanone peroxide and methylcyclohexanone peroxide; peroxyketals such as 1,1-bis(tert-butylperoxy)-3,3,5-trimethylcyclohexane, 1,1-bis(tert-butylperoxy)cyclohexane and n-butyl-4,4-bis(tert-butylperoxy)valerate; hydroperoxides such as cumene hydroperoxide and 2,5-dimethylhexane -2,5-dihydroperoxide; dialkylperoxides such as 1,3-bis(tert-butylperoxy-m-isopropyl)benzene, 2,5-dimethyl-2,5-di(tert-butylperoxy)hexane, diisopropylbenzene peroxide and tert-butylcumyl peroxide; diacyl peroxides such as decanoyl peroxide, lauroyl peroxide, benzoyl peroxide and 2,4-dichlorobenzoyl peroxide; peroxycarbonates such as bis(tert-butylcyclohexyl)peroxydicarbonate; and peroxy esters such as tert-butylperoxybenzoate and 2,5-dimethyl-2,5-di(benzoylperoxy)hexane; and azo polymerization initiators like 2,2'-azobisisobutyronitrile, 1,1-azobis(cyclohexane-1-carbonitrile), azocumene-2,2'-azobismethylvaleronitrile and 4,4'-azobis(4-cyanovalerianic acid). The use rate of these polymerization initiators is not critical. Normally, however, it is desirably within a range of 0.1–15 parts by weight, in particular 0.3–10 parts by weight, per 100 parts by weight of the total of the monomers to be copolymerized.

In the above-mentioned polymerization reaction, the method of addition of the monomeric components or the polymerization initiator is not critical. The polymerization initiator is, however, conveniently added dropwise plural times by portions over the time spun from the initial stage of polymerization to the advanced stage, rather than added in a lump sum at the initial stage, for the sake of effective temperature control during the polymerization reaction and of the prevention of undesirable cross-linked product such as gel from formed.

The molecular weight of thus produced copolymer is not in particular restricted. Preferably, however, the weight average molecular weight of copolymer is within a range of 500 to 100,000, in particular 1,000 to 70,000, especially 3,000 to 50,000, from a viewpoint of aqueous dispersion stability, pigment dispersibility, viscosity, VOC and color number (degree of pigmentation).

The pigment dispersing resin of this invention which comprises copolymer produced in the afore-mentioned manner is used for the preparation of water-based pigment dispersion. The pigment dispersion resin is therefore required to have both wettability with regard to pigment and pigment dispersion stability. Monomer (A) component which constitutes the pigment dispersing resin of this invention is capable of improving the adsorption of pigment dispersing resin to pigment, and thus acts advantageously for the improvement both in wettability with regard to pigment and in the dispersion stability of resin. Monomer (B) component which constitutes the pigment dispersing resin of this invention contributes to the improvement of pigment dispersing resin in the solubility in continuous phase (aqueous medium), and acts advantageously in particular for the improvement of pigment dispersing resin in dispersion stability. Furthermore, copolymerization with use of tertiary amino group-containing polymerizable unsaturated monomer in combination with monomer (A) provides a pigment dispersing resin which has remarkably improved capability to disperse black (carbon black) pigment which is said to be especially difficult to be dispersed.

Hence, the pigment dispersing resin of this invention is quite useful for the preparation of water-based pigment dispersion together with pigment and aqueous medium.

Water-based Pigment Dispersion

The water-based pigment dispersion of this invention can be prepared by blending, with the afore-mentioned pigment dispersing resin of the invention, pigment, aqueous medium and, as circumstances may demand, other pigment dispersing resins, dispersing agent, basic neutralizer and other additives as well.

Examples of pigment include: bright pigments such as aluminum powder, copper powder, nickel powder, stainless steel powder, chromium powder, micaceous iron oxide, titanium dioxide-coated mica powder, iron oxide-coated mica powder and bright graphite; organic red pigments such as Pink EB, azo- and quinacridone-derived pigments; organic blue pigments such as cyanin blue and cyanin green; organic yellow pigments such as benzimidazolone-, isoindolin- and quinophthalone-derived pigments; inorganic colored pigments such as titanium white, titanium yellow, iron red, carbon black, chrome yellow, iron oxide and various calcined pigments. Also extender pigment may be included.

These pigments may be subjected to any known treatment such as acid base treatment, coupling agent treatment or oxidation/reduction treatment.

Among the above pigments, concrete examples of pigments which are used in particular for ink-jet ink include black pigment like Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080 and Raven 1060 (which are manufactured by Columbian Carbon Co.); Rega1400R, Regal330R, Regal660R, Mogul L, Black Pearls L, Monarch 700, Monarch 800, Monarch 880, Monarch 900, Monarch 1000, Monarch 1100, Monarch 1300 and Monarch 1400 (which are manufactured by Cabot Co.); Color Black FW1, Color Black FW2, Color Black FW2V, Color Black 18, Color Black FW200, Color Black S150, Color Black S160, Color Black S170, Printex35, PrintexU, PrintexV, Printex140U, Printex140V, Special Black 6, Special Black 5, Special Black 4A and Special Black 4 (which are manufactured by Degussa Co.); No. 25, No. 33, No. 40, No. 47, No. 52, No. 900, No. 2300, MCF-88, MA600, MA7, MA8 and MA100 (which are manufactured by Mitsubishi Chemical Corporation); cyanic color pigment like C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60; magenta color pigment like C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184 and C.I. Pigment Red-202; and yellow color pigment like C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154. These are only examples, and not restrictive at all.

Blend ratios of these pigments are not subject to specific limitations. Normally, however, they are within a range of 10–3,000, preferably 15–2,000, inter alia 15–1,500 parts by weight, per 100 parts by weight of a pigment dispersing resin of the present invention in consideration of pigment dispersing ability, dispersion stability and color developing property of resulting pigment dispersions.

Examples of useful aqueous medium include water and water-organic solvent mixtures formed by dissolving organic solvent such as water-soluble organic solvent in water. Useful organic solvent in such mixtures include, for example, water-soluble organic solvents such as methyl alcohol, ethyl alcohol, isopropyl alcohol, propylpropylene glycol, butyl cellosolve, propylene glycol monomethyl ether and 3-methyl-3-methoxybutanol; and water-hardly-soluble or water-insoluble organic solvents such as xylene, toluene, cyclohexanone, hexane and pentane. These organic solvents may be used either singly or as a mixture of two or more. Water-insoluble organic solvent may be concurrently used with water-soluble organic solvent, in minor quantities. The mixing ratio of water and organic solvent is not critical. It is desirable, however, that the organic solvent content of the mixture does not exceed 50%, in particular 35%, by weight. The blend ratio of the aqueous medium is not critical. It is desirable, however, that the ratio is within a range of 50–5,000, preferably 100–3,000, inter alia 100–2,000, parts by weight per 100 parts by weight of a pigment dispersing resin or resins of the present invention in respect of viscosity in the occasion of dispersing the pigment, pigment dispersing ability, dispersion stability and production efficiency.

Examples of other pigment dispersing resins which are used where necessary include acryilc resin which is produced by the copolymerization of carboxylic group-containing polymerizable unsaturated monomer such as (meth) acrylic acid with hydroxyl group-containing polymerizable unsaturated monomer such as 2-hydroxyethyl (meth)acrylate and other polymerizable unsaturated monomer in the presence of radical polymerization initiator. Such an acrylic resin preferably has a weight average molecular weight within a range of about 2,000 to 150,000, in particular 5,000 to 100,000, and an acid value in a range of 5 to 150, especially 15 to 80, and a hydroxyl value in a range of 10 to 160, in particular 30 to 120. Other pigment dispersing resins also include polyester resin which is produced by condensation reaction between polyhydric alcohol such as ethylene glycol, butylene glycol, 1,6-hexane diol, trimethylol propane and pentaerythritol and polyvalent carboxylic acid component such as adipic acid, isophthalic acid, terephthalic acid, phthalic anhydride, hexahydrophthalic anhydride and trimellitic acid anhydride. Such a polyester resin preferably has a weight average molecular weight within a range of about 1,000 to 100,000, in particular 1,500 to 70,000, and an acid value in a range of 5 to 150, especially 10 to 75, and a hydroxyl value in a range of 10 to 160, in particular 30 to 120.

In the process of production of water-based pigment dispersion of this invention, pigment and pigment dispersing resin of this invention are usually diluted with other pigment dispersing resin after dispersed in aqueous medium. Owing to this dilution, the resultant dispersion has stability as enamel or long-term storage stability, or becomes readily miscible with binder component of paint etc.

As for the proportion of the pigment dispersing resin (I) of this invention and other pigment dispersing resin (II), resin (II) is suitably used in an amount of 5 to 300 parts by weight, in particular 20 to 150 parts by weight, per 100 parts by weight of resin (I).

As examples of dispersing agent to be used where necessary, Disperbyk™ 184 or 190 (BYK-Chemie Co.) may be named. Other usable additives include anti-foaming agent, antiseptic, rust-proofing agent and plasticizing agent. It is desirable that blend ratio of any of these additives does not exceed 50 parts by weight per 100 parts by weight of the pigment dispersing resin of the present invention in respect of pigment dispersing ability of the resin, stability of the pigment paste, let-down stability or coating film performance.

When other pigment dispersing resins have carboxyl groups, basic neutralizer is used to neutralize the carboxyl groups and to make said other pigment dispersing resins water-soluble or water-dispersible. Specific examples of such a basic neutralizer include inorganic bases such as ammonium hydroxide, sodium hydroxide and potassium hydroxide; and amines such as aminomethyl propanol, aminoethylpropanol, dimethylethanolamine, triethylamine, diethylethanolamine, dimethylaminopropanol and aminomethylpropanol. Such a basic neutralizer should be used in a sufficient rate to render said other pigment dispersing resins water-soluble or water-dispersible. Normally, therefore, basic neutralizer is used at a rate sufficient to make the neutralization equivalent of carboxyl group in said other pigment dispersing resins 0.3–1.5, preferably 0.4–1.3.

In this invention, no basic neutralizer is desirably used when pigment is to be dispersed with use of the pigment dispersing resin of this invention. If a basic neutralizer is used, pigment adsorbs the basic neutralizer before the pigment dispersing resin of this invention is adsorbed on the pigment, with the result that dispersibility may possibly be damaged. When, on the other hand, pigment is dispersed by the pigment dispersing resin of this invention and is then diluted with other pigment dispersing resins, neutralization with basic neutralizer is desirable.

Water-based pigment dispersions can be formulated by homogeneously mixing and dispersing the above-described components with a dispersing machine such as paint shaker, Scandix, LMZ mill, DCP pearl mill and the like.

Water-based Paint Compositions

Thus prepared water-based pigment dispersion can be blended with binder resin for paint and suitably with other additives such as aqueous medium, fine polymer particles, curing catalyst, basic neutralizer, ultraviolet absorber, ultraviolet stabilizer, paint film surface regulating agent, antioxidant, flow property regulator, silane coupling agent and the like, and stably dispersed in aqueous medium to provide a water-based paint composition.

Useful paint binder resins include combination of base resins which are normally used in the field of water-soluble or water-dispersible paint, with curing agent. Examples of such base resin include hydroxyl group-containing acrylic resin, hydroxyl group-containing polyester resin, epoxy group-containing copolymer resin and carboxyl group-containing high acid value resin. As examples of useful curing agent, amino resins and optionally-blocked polyisocyanate compounds can be named, which can be used either singly or in combination.

As said hydroxyl group-containing acrylic resin, copolymers having a weight-average molecular weight within a range of from about 2,000 to about 100,000, in particular, from 5,000 to 50,000, which are obtained by copolymerization of a hydroxyl group-containing polymerizable unsaturated monomer such as 2-hydroxyethyl (meth)acrylate with other polymerizable unsaturated monomer or monomers in the presence of a radical polymerization initiator are preferred.

As hydroxyl group-containing polyester resin, those having a weight-average molecular weight within a range of from about 1,000 to about 100,000, in particular, from 1,500 to 70,000, which are obtained by condensation reaction between polyhydric alcohols such as ethylene glycol, butylene glycol, 1,6-hexanediol, trimethylolpropane and pentaerythritol, and polyvalent carboxylic acids such as adipic acid, isophthalic acid, terephthalic acid, phthalic anhydride, hexahydrophthalic anhydride and trimellitic anhydride are preferred.

As amino resins which are used as curing agent, melamine resins are used in general. In particular, methylolmelamine resins and melamine resins whose methylol groups are at least partially etherified with $C_1$–$C_4$ monohydric alcohols are suitable. While it is preferred that they be water-soluble or water-dispersible, water-insoluble ones can also be used.

As commercially available melamine resins useful for the above purpose, the following may be named for example: butyl etherified melamine resins such as U-Van™ 20SE-60 and 225 (Mitsui Chemicals, Inc.), Super Beckamine™ G840 and G821 (Dainippon Ink & Chemicals, Inc.); methyl etherified melamine resins such as Sumimal™ M-100, M-40S and M-55 (Sumitomo Chemical Co., Ltd.), Cymel™ 303, 325, 327, 350 and 370 (Mitsui Cytec Co., Ltd.), Nikalac™ MS17 and MS15 (Sanwa Chemical Co., Ltd.) and Resimine™ 741 (Monsanto Co.); methyl- and iso-butyl-mixed etherified melamine resins such as Cymel™ 235, 202, 238, 254, 272 and 1130 (Mitsui Cytec Co., Ltd.), and Sumimal™ M66B (Sumitomo Chemical Co., Ltd.); and methyl- and n-butyl-mixed etherified melamine resins such as Cymel™ XV805 (Mitsui Cytec Co., Ltd.) and Nikalac™ MS95 (Sanwa Chemical Co., Ltd.).

Said optionally-blocked polyisocyanate compounds usable as the curing agent include both of polyisocyanate compounds having free isocyanate groups and those in which isocyanate groups are blocked.

Examples of polyisocyanate compounds having free isocyanate groups include organic polyisocyanates per se, e.g., aliphatic diisocyanates such as hexamethylenediisocyanate and trimethylhexamethylenediisocyanate; cycloaliphatic diisocyanates such as hydrogenated xylylenediisocyanate and isophoronediisocyanate; aromatic diisocyanates such as tolylenediisocyanate and 4,4'-diphenylmethanediisocyanate; and polyisocyanate compounds having not less than 3 isocyanate groups such as triphenylmethane-4,4', 4''-triisocyanate, 1,3,5-triisocyanatebenzene, 2,4,6-triisocyanatetoluene and 4,4'-dimethyldiphenylmethane-2,2', 5,5'-tetraisocyanate. These organic polyisocyanates may be used in such forms as adducts with polyhydric alcohol, low molecular weight polyester resin, water or the like; or cyclized polymers composed of these organic polyisocyanates, or isocyanate biuret.

As commercially available polyisocyanate compounds having free isocyanate groups, for example, Burnock™ D-750, -800, DN-950, DN-970 and DN-15-455 (Dainippon Ink & Chemicals, Inc.); Desmodur™ L, N, HL and N3390 (Sumitomo Bayer Urethane Co., Ltd.); Takenate™ D-102, -202, -110 and -123N (Takeda Chemical Industries, Ltd.); Coronate™ EH, L, HL and 203 (Nippon Polyurethane Industry Co., Ltd.); and Duranate™ 24A-90CX (Asahi Chemical Industry Co., Ltd.) may be named.

As polyisocyanate compounds in which isocyanate groups are blocked, those formed by blocking isocyanate groups in the above-described polyisocyanate compounds having free isocyanate groups, with a known blocking agent such as oxime, phenol, alcohol, lactam, malonic acid ester or mercaptane can be used. Typical commercially available polyisocyanate compounds whose isocyanate groups are blocked include Burnock™ D-550 (Dainippon Ink & Chemicals, Inc.), Takenate™ B-815-N (Takeda Chemical Industries, Ltd.), Additol™ VXL-80 (Hoechst AG, Germany), Coronate™ 2507 (Nippon Polyurethane Industry Co., Ltd.) and Desmodur™ N3500 (Sumitomo Bayer Urethane Co., Ltd.).

The aqueous medium which is used when necessity arises can be suitably selected from those useful for preparing the pigment dispersions as earlier explained.

The fine polymer particles are provided by a polymer which does not dissolve in water-based paint compositions of the present invention but disperses as fine particles. Suitable average particle size normally is within a range of 0.01–1 μm, preferably 0.05–0.8 μm. Inside of the particles may either be crosslinked or not, the former being preferred. As such fine polymer particles, those known per se as flow property regulator in the field of paint can be used.

Where an optionally-blocked polyisocyanate compound is used as the curing agent, organometal catalysts such as dibutyltin diacetate, dibutyltin dioctate, dibutyltin dilaurate and the like; and amines such as triethylamine, diethanolamine and the like can be conveniently used as the curing catalyst. When an amino resin such as melamine resin is used as the curing agent, such curing catalyst as sulfonic acid compound, e.g., paratoluenesulfonic acid, dodecylbenzensulfonic acid and dinonylnaphthalenesulfonic acid; or amine-neutralization products of these sulfonic acid compounds are conveniently used.

As examples of ultraviolet absorber, benzophenone, benzotriazole, cyanoacrylate, salicylate and oxalic acid anilide compounds may be named. As the ultraviolet stabilizer, hindered amine compounds can be used.

The water-based paint compositions according to the invention are useful as coloring paint compositions (including metallic paint and iridescent paint) into which various pigments such as coloring pigments, metallic pigments and iridescent pigments are blended. In particular, they can be conveniently used as top coating paint (coloring base coat) for automotive finish.

The paint compositions according to the invention can be applied onto various substrate, following the practice known per se, and can form cured coating film when baked normally at temperatures of from about 80° C. to about 180° C., for about 10–60 minutes. Where a short time baking is desired, for example, a cured coating film can be formed by baking under such conditions as will attain the highest temperature of from about 180° C. to about 250° C. of the material being baked, for about 20–about 60 seconds.

Substrate to be coated with the paint compositions of the present invention are subject to no specific limitation, examples of which include metallic substrate such as steel sheet, aluminum, tin and the like; other substrate such as of mortar, cement, plastics, glass and the like; and these substrates which have been subjected to surface treatment and/or coating film formation. In particular, metallic substrates and plastic substrates are suitable for use.

Examples of steel sheet include cold-rolled steel sheet, molten galvanized steel sheet, electrogalvanized steel sheet, aluminum plated steel sheet, stainless steel sheet, copper plated steel sheet, tin plated steel sheet, lead-tin alloy plated steel sheet (ternesheet); steel sheet plated with zinc alloy such as iron-zinc, aluminum-zinc, nickel-zinc alloys and the like. As surface-treated steel sheet, for example, steel sheet which is given a chemical treatment such as phosphate treatment, chromate treatment and the like may be named.

As the substrate on which coating film has been formed, a substrate which has been optionally surface treated and thereafter primer-coated, or said substrate which is further coated with an inter-coat can be used.

When a paint composition according to the present invention is used for automotive finish, typical substrates include: a chemically treated steel sheet which is further electrodeposition-coated with primer and optionally coated with an inter coat thereon; various plastic substrates (which have been optionally surface treated, primer-coated or further coated with an inter coat); and composite members which are combination of the foregoing.

The electrodepositing paint for electrodeposition coating may be anionic or cationic, cationic type being preferred because of good corrosion resistance. As cationic electrodeposition paint, any of those known per se can be used. For example, those containing as the resin component a base resin having hydroxyl groups and cationic groups and as the curing agent a blocked polyisocyanate compound can be conveniently used.

The water-based paint compositions according to the present invention are conveniently used for colored coating film-forming compositions for 1-coat-1-bake finish of substrates, and for top coating colored base paint compositions in 2-coat-1-bake (2C1B), 2-coat-2-bake (2C2B), 3-coat-1-bake (3C1B), 3-coat-2-bake (3C2B), or 3-coat-3-bake (3C3B) systems.

Where the paint compositions according to the present invention are used for colored top coating for automobiles, the top coat can be formed through the steps of, applying the paint composition onto a primer film such as an electrodeposited coating film or onto an uncured or cured inter coat applied onto such a primer film, by such means as electrostatic atomizing coating (bell-type or the like) or aerosol coating, to a dry film thickness of normally from about 10 to about 60 µm; and allowing it to stand for several minutes at room temperature, or forcedly drying the film for several minutes at temperatures ranging from about 50 to about 80° C.; thereafter applying a clear top coat paint thereon; and baking the same at temperatures of from about 120 to about 180° C. normally for about 10–about 60 minutes. It is also possible to apply a clear top coating paint onto the uncured or cured colored top coat film, by such means as electrostatic atomizing coating (bell-type or the like) or aerosol coating, to a dry film thickness of normally from about 20 to about 100 µm followed by curing, to form multi-layered top coating film.

As such clear top coating paint to be applied onto the above-described colored top coat, those conveniently used are clear top coating paints comprising at least one base resin having a crosslinkable functional group (e.g., hydroxyl, epoxy, carboxyl, alkoxysilane group and the like) such as acrylic, vinyl, polyester, alkyd and urethane resins; and at least one crosslinking agent for crosslinking and curing the base resin, such as alkyletherified melamine resin, urea resin, guanamine resin, optionally-blocked polyisocyanate compound, epoxy resin and carboxyl-containing compound. In such clear top coating paint, convenient blend ratio of the base resin and the crosslinking agent is, based on the sum of the two components, normally 50–90% by weight of the base resin component and 10–50% by weight of the crosslinking agent component. The form of such clear top coating paint is subject to no specific limitation, and it can take any desired form such as organic solvent type, non-aqueous liquid dispersion type, aqueous solution type, aqueous dispersion (slurry) type, high solid type or powder type.

Water-based Ink Composition

According to this invention, water-based ink composition can be prepared from the above-mentioned water-based pigment dispersion as it is, or from said water-based pigment dispersion and, added thereto if necessary, additives such as aqueous medium, water soluble resin, thickening agent, fluidity adjustor, film forming assistant, surfactant, pH adjustor, mildew-proofing agent, antioxidant, ultraviolet absorbing agent, ultraviolet stabilizing agent and chelating agent and dye stuffs as well.

As aqueous medium, anyone may be selected for use from those explained above as ones which are usable where necessary for the production of the water-based pigment dispersion of this invention.

As water soluble resin, there may be used, from the viewpoint of ink property control, polyethylene imine, polyamines, polyvinyl pyrrolidone, cellulose derivative, polysaccharides, acrylic emulsion or polyurethane emulsion.

Dispersed particles which are contained in the water-based ink composition of this invention have preferably an average particle size in a range of 1 to 300 nm, in particular 1 to 200 nm. The viscosity of ink liquid is preferably within a range of 1.0 to 10 mPa·s, in particular 1.5 to 7 mPa·s.

The water-based ink composition of this invention is in particular suitable as ink-jet ink, and is used for ink-jet drawing by usual ink-jet drawing system. Ink-jet drawing system may be any of piezo ink-jet type, thermal ink-jet type or any other known type. The water-based ink composition of this invention may be applied not only to normal ink-jet drawing device but also to a drawing device which is equipped with heater or the like with which to control ink drying; to a recording device which is equipped with intermediate transfer mechanism by which to print recording material on an intermediate medium and then to transfer the resultant print on recording medium such as paper; and to automatic drawing device by which to directly paint wall, outdoor sign board or automobile body.

Substrate on which the ink composition of this invention is to be applied is not restricted in particular. There may be mentioned base material such as paper, metal or plastics; base material such as mortar or slate; or these base materials which have been subjected to surface treatment and/or coating film formation.

EXAMPLES

Hereinafter the invention is explained in further details, referring to production examples, working examples and comparative examples, in which parts and percentages are by weight unless otherwise specified.

Preparation of Pigment Dispersing Resins

Example 1

An ordinary reaction vessel for producing acrylic resins, equipped with a stirrer, thermometer and a reflux condenser was charged with 45 parts of ethylene glycol monobutyl ether. The content in the vessel was heated under stirring, and maintained at 110° C. Into the system, a mixture of 10 parts of styrene, 40 parts of methyl methacrylate, 25 parts of n-butyl methacrylate, 10 parts of 2-hydroxyethyl methacrylate, 3 parts of methacrylic acid, 7 parts of 2-(methacryloyloxy)ethyltrimethyl ammonium chloride, 5 parts of "NF BISOMER™ PEM6E" (trademark of polyethylene glycol monomethacrylate having a molecular weight of about 350, manufactured by Dai-ich Kogyo Seiyaku Co., Ltd.,), 4 parts of azobisisobutyronitrile and 15 parts of isobutyl alcohol was added dropwise over a period of 3 hours, followed by 30 minutes' aging at 110° C. Then an additional catalytic liquid mixture of 20 parts of ethylene glycol monobutyl ether and 0.5 part of azobisisobutyronitrile was added dropwise over a period of 1 hour, followed by an hour's aging at 110° C. and cooling. Thus, a pigment dispersing resin (A-1) solution having a solid content of 55% was obtained.

Examples 2–9 and Comparative Examples 1–11

Example 1 was repeated except that the formulation of the used components was varied for each run as shown in the following Tables 1 and 2, to provide solutions of pigment dispersing resins (A-2) to (A-9), and solutions of pigment dispersing resins (AC-1) to (AC-11). The solid contents of these solutions, and resin acid values of these resins are as shown in the same Tables 1 and 2. The note (*1) in Tables 1 and 2 means as follows Incidentally, the amount of NF BISOMER™ S20W in Table 1 is shown by solid content.

TABLE 1

| | | | | | Examples | | | | | |
|---|---|---|---|---|---|---|---|---|---|---|
| | | 1 | 2 | 3 | 4 | 5 | 6 | 7 | 8 | 9 |
| Solution of pigment-dispersing resin | | A-1 | A-2 | A-3 | A-4 | A-5 | A-6 | A-7 | A-8 | A-9 |
| Ethylene glycol monobutyl ether | | 45 | 35 | 38 | 38 | 38 | 38 | 38 | 38 | 38 |
| Isobutyl alcohol | | | | 32 | 32 | 32 | 32 | 32 | 32 | 32 |
| Styrene | | 10 | 10 | | | | | | | |
| Methyl methacrylate | | 40 | 40 | 50 | 48 | 40 | 40 | 50 | 48 | 40 |
| n-Butyl acrylate | | | | 20 | 20 | 20 | 20 | 20 | 20 | 20 |
| n-Butyl methacrylate | | 25 | 25 | | | | | | | |
| 2-Ethylhexyl methacrylate | | | | | | | | | | |
| Isostearyl acrylate | | | | | | 10 | | | | 10 |
| Lauryl methacrylate | | | | | | | | | | |
| 2-Hydroxyethyl methacrylate | | 10 | 10 | | | | | | | |
| 2-Hydroxyethyl acrylate | | | | 5 | 5 | 5 | 5 | 5 | 5 | 5 |
| Methacrylic acid | | 3 | | | | | | | | |
| Dimethylaminoethyl methacrylate | | | | | | | 10 | | | |
| Methacryloyloxyethyl trimethyl ammonium chloride | | 7 | | 5 | 7 | 5 | 5 | | | |
| 2-Acrylamide-2-methylsulfonic acid | | | 5 | | | | | 5 | 7 | 5 |
| NF BISOMER ™ PEM6E | | 5 | 10 | | | | | | | |
| NF BISOMER ™ S20W (*1) | | | | 20 | 20 | 20 | 20 | 20 | 20 | 20 |
| Deionized water | | | 10 | | | | | | | |
| Azobisisobutyronitrile | | 4 | 4 | 1 | 1 | 1 | 1 | 1 | 1 | 1 |
| Isobutylalcohol | | 15 | 20 | | | | | | | |
| Additional catalytic mixture | Ethyleneglicol monobutyl ether | 20 | 15 | 10 | 10 | 10 | 10 | 10 | 10 | 10 |
| | Azobisisobutyronitrile | 0.5 | 0.5 | 0.5 | 0.5 | 0.5 | 0.5 | 0.5 | 0.5 | 0.5 |
| Special value | Solid content (%) | 55 | 55 | 50 | 50 | 50 | 50 | 50 | 50 | 50 |
| | Resin acid value (mgKOH/g) | 19.6 | 5 | — | — | — | — | 38 | 50 | 38 |
| | Hydroxyl value (mgKOH/g) | 43 | 43 | 24 | 24 | 24 | 24 | 24 | 24 | 24 |
| | Weight average molecular weight | 20000 | 20000 | 35000 | 35000 | 35000 | 35000 | 35000 | 35000 | 35000 |

Note (*1) NF BISOMER ™ S20W: Trademark of 50% water-diluted methoxy polyethylene glycol monomethacrylate having a molecular weight of about 2080, manufactured by Dai-ichi Kogyo Seiyaku Co., Ltd.)

TABLE 2

| | | | | | Examples | | | | | | |
|---|---|---|---|---|---|---|---|---|---|---|---|
| | 1 | 2 | 3 | 4 | 5 | 6 | 7 | 8 | 9 | 10 | 11 |
| Solution of pigment-dispersing resin | AC-1 | AC-2 | AC-3 | AC-4 | AC-5 | AC-6 | A-7 | AC-8 | AC-9 | AC-10 | AC-11 |
| Ethylene glycol monobutyl ether | 55 | 55 | 55 | 55 | 55 | 55 | 65 | 25 | 38 | 50 | 33 |
| Isobutyl alcohol | | | | | | | | | 32 | 20 | 32 |
| Styrene | | 10 | 10 | | | 10 | 10 | 10 | | | |
| Methyl methacrylate | 40 | 40 | 30 | 36 | 33 | 32 | 32 | 32 | 55 | 44 | 60 |
| n-Butyl acrylate | | | | | | | | | 20 | 20 | 25 |
| n-Butyl methacrylate | 39 | 30 | 20 | | 20 | 20 | 20 | 20 | | | |
| 2-Ethylhexyl methacrylate | | | | 20 | | 20 | 20 | 20 | | 20 | |
| Lauryl methacrylate | | | | | 10 | | | | | | |
| 2-Hydroxyethyl methacrylate | 10 | 5 | 13 | 10 | 10 | 10 | 10 | 10 | | 10 | |
| 2-Hydroxyethyl acrylate | | | | | | | | | 5 | | 5 |
| Methacrylic acid | 6 | 5 | 7 | 6 | 5 | 8 | 8 | 8 | | | |
| Acryl acid | | | | | | | | | | 6 | |
| Dimethylaminoethyl methacrylate | | 5 | 20 | | | | | | | | |
| Methacryloyloxyethyl trimethyl ammonium chloride | | | | 8 | | | | | | | |

TABLE 2-continued

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| 2-Acrylamide-2-methylsulfonic acid | | | | | | 2 | | | | | | 5 |
| NF BISOMER ™ PEM6E | | | 10 | | | | | | | | | |
| Deionized water | | | | | | 5 | | | | | | |
| Azobisisobutyronitrile | | 4 | 4 | 4 | 4 | 8 | 4 | 1 | 8 | 1 | 1 | 1 |
| Isobutylalcohol | | 5 | 5 | 5 | 5 | 5 | 5 | 15 | 20 | | | |
| Additional catalytic mixture | Ethyleneglicol monobutyl ether | 20 | 20 | Gelatinized | 20 | 15 | 20 | 20 | 20 | 10 | 10 | 10 |
| | Azobisisobutyronitrile | 0.5 | 0.5 | | 0.5 | 0.5 | 0.5 | 0.5 | 0.5 | 0.5 | 0.5 | 0.5 |
| Special value | Solid content (%) | 55 | 55 | | 55 | 55 | 55 | 50 | 60 | 50 | 50 | 50 |
| | Resin acid value (mgKOH/g) | 39 | 32 | | 39 | 34 | 52 | 52 | 52 | — | 47 | 38 |
| | Hydroxyl value (mgKOH/g) | 43 | 21.5 | | 43 | 43 | 43 | 43 | 43 | 24 | 43 | 24 |
| | Weight average molecular weight | 20000 | 20000 | | 20000 | 20000 | 20000 | 40000 | 15000 | 35000 | 40000 | 35000 |

Synthesis Example 1

A reaction vessel equipped with a stirrer, thermometer, rectification column and nitrogen inlet pipe was charged with 208.8 parts of isophthalic acid, 387.5 parts of hexahydrophthalic acid, 275.5 parts of adipic acid, 198.1 parts of neopentyl glycol, 371.1 parts of 1,6-hexanediol and 171.1 parts of trimethylolpropane, which were heated under stirring while nitrogen gas was introduced. After the temperature reached 160° C, the system was gradually heated to 235° C. over a period of 3 hours, followed by 1.5 hours' aging. Thereafter the rectification column was switched to reflux condenser, and the reaction was conducted after introduction of 100 parts of toluene, under reflux. The reaction was continued for 6 hours at 235° C., and thereafter the toluene was removed under reduced pressure. The system was cooled to 170° C., followed by the addition of 120.8 parts of trimellitic anhydride and 30 minutes' aging at 170° C. Then, 322 parts of butyl cellosolve was added, and the system was thereafter cooled to 80° C. Subsequently, 4 parts of N,N-dimethylaminoethanol was added, and the system was allowed to stand at 80° C. for 30 minutes, and was then cooled to 50° C. Subsequently, 2600 parts of deionized water was added, and the resultant mixture was stirred for 30 minutes. Thus, a polyester resin (PP-1) solution having a solid concentration of 35% was obtained. Thus obtained resin had an acid value of 90 mgKOH/g, a hydroxyl value of 55 mgKOH/g and a weight average molecular weight of 28,000.

Preparation of Water-based Pigment Dispersions

Examples 10 to 17 and Comparative Examples 12 to 21

A wide-mouthed glass bottle of 225 cc in capacity was fed with those pigment dispersing resin solutions which had been produced in the above Examples 1 to 2 and Comparative Examples 1 to 8, pigment, and, if necessay, with neutralizing amine (N,N-dimethylamino ethanol) as well, and further with deionized water at the compositional formulation as shown by Tables 3 and 4 below, and was further fed with glass beads of about 1.3 mm in diameter as a dispersing medium. The bottle was then sealed, and the content was dispersed with a paint shaker for 4 hours to give water-based pigment dispersions (B-1) to (B-8) and (BC-1) to (BC-10).

Preparation of Water-based Ink

Examples 18 to 42 and Comparative Examples 22 to 36

A wide-mouthed glass bottle of 225 cc in capacity was fed with those pigment dispersing resin solutions which had been produced in the above Examples 3 to 9 and Comparative Examples 9 to 11, the polyester resin solution which had been prepared in the above-mentioned Synthesis Example 1, pigment, and, if necessary, with neutralizing amine (N,N-dimethylamino ethanol) as well, and further with deionized water at the compositional formulation as shown by Tables 5 and 6 below, and was further fed with glass beads of about 1.3 mm in diameter as a dispersing medium. The bottle was then sealed, and the content was dispersed with a paint shaker for 4 hours to give water-based ink. In the above, acrylic resin solution (AC-10) and polyester resin solution (PP-1) each for dilution, and neutralizing amine were added after pigment dispersing resin solutions and pigments had been sufficiently dispersed.

The following are explanations of notes in Tables 3 to 6.

| (NOTE 1) RT 355D: | an organic red pigment manufactured by Ciba Specialty Chemicals, Inc., under tradename of "Cinquasia Magenta RT 355D" |
|---|---|
| (NOTE 2) G 314: | an organic blue pigment manufactured by Sanyo Color Works, Ltd., under tradename of "Cyanin Blue G314" |
| (NOTE 3) MT500HD: | tradename of an inorganic white pigment manufactured by TAYCA Corporation |
| (NOTE 4) Raven 5000 UIII: | tradename of carbon black pigment manufactured by Columbia Carbon Co., Ltd. |
| (NOTE 5) Disper BYK-192: | tradename of wetting-dispersing agent manufactured by BYK-Chemie Co. |
| (NOTE 6) TG730: | tradename of wetting-dispersing agent manufactured by Kyoei Kagaku K.K. |
| (NOTE 7) Disper BYK-182: | tradename of wetting-dispersing agent manufactured by BYK-Chemie Co. |

-continued

| | |
|---|---|
| (NOTE 8) Disper BYK-191: | tradename of wetting-dispersing agent manufactured by BYK-Chemie Co. |
| (NOTE 9) S#2000: | tradename of wetting-dispersing agent manufactured by Avecia Ltd. |
| (NOTE 10) BYK-028: | trademark of anti-foaming agent manufactured by BYK-Chemie Co. |

Performance Test

Water-based pigment dispersions which had been obtained in the above Examples 10 to 17 and Comparative Examples 12 to 21 were subjected to performance test by the following test method. Results are shown in Tables 3 and 4 which are mentioned later. Besides, each of water-based ink which had been obtained in the above Examples 18 to 42 and Comparative Examples 22 to 36 was also subjected to performance test by the following test method. Results are shown in Tables 5 and 6 which are mentioned later.

Performance Test Method

Appearance of Coating Film:

Each of the pigment dispersion paste was applied onto a 100×200 mm transparent PET film with a bar coater to a dry film thickness of 15 μm, and baked at 140° C. for 15 minutes. The extent of turbidity of the coating on the PET film was visually evaluated according to the following grading standard:
○: Uniform and perfectly free of turbidity.
Δ: Slightly turbid.
X: Considerably turbid.

State of Paste:

The state of each water-based ink in glass container was visually observed according to the following criteria.
○: Uniform, and perfectly free of precipitate and foam.
Δ: A small amount of precipitate and foam is observed.
X: A considerable amount of precipitate and foam is observed.

Gloss:

Each pigment dispersion was applied onto PET film with a doctor blade so that coating film thickness might be 100 μm. Water-based ink was applied onto PET film with a doctor blade so that coating film thickness might be 50 μm. The gloss of dried coating films of pigment dispersion and of water-based ink was determined by the measurement of 60° mirror surface reflectivity in accordance with JIS K5400 7.6 (1990)

Light Transmission:

Each pigment dispersion was applied onto PET film with a doctor blade so that coating film thickness might be 100 μm. Water-based ink was applied onto PET film with a doctor blade so that coating film thickness might be 50 μm. The light transmission (%) of dried coating films of pigment dispersion and of water-based ink was determined with a turbidimeter (COH-300) in accordance with the equation below, and, thus, transparency was evaluated:

Light transmission (%)=100×[1−(scattered light intensity/radiated light intensity)]

Viscoelasticity Characteristics:

Viscosity [Pascal·sec (Pa·sec.)] and yield point (dyn/cm$^2$) were measured with a dynamic viscoelasticity measuring apparatus, MR-300 (Rheology Co.).

Blackness:

Water-based ink which had been prepared in Examples 18 to 24 and Comparative Examples 22 to 26 were each applied onto PET film with a doctor blade so that coating film thickness might be 50 μm. The blackness of dried coating film was evaluated by BI value. "BI value", which is an abbreviation of Blackness Index, is expressed by the following equation:

$$BI \text{ value}=(1-L^*/3.5)\times 100$$

L* is the index of brightness as shown by JIS Z-8105. The higher BI value means the better blackness.

| | |
|---|---|
| BI value is 100: | Perfect blackness |
| BI value is 0: | Marginal blackness which is recognized by human eye as such |
| BI value is less than 0: | Gray |

Hue—Coloring Power:

Each of water-based ink which had been prepared in Examples 32 to 42 and Comparative Examples 33 to 36 was applied onto black and white PET films with a doctor blade so that coating film thickness might be 50 μm. L*, a* and b* of dried coating film was measured with a spectrocolorimeter (made by BYK-Chemie Co.), and, thus, hue and coloring power were evaluated. It was known from the results of L*, a* and b* that Examples showed strong coloring power and improved chroma.

TABLE 3

| | Example | | | | | | | |
|---|---|---|---|---|---|---|---|---|
| | 10 | 11 | 12 | 13 | 14 | 15 | 16 | 17 |
| Pigment dispersion | B-1 | B-2 | B-3 | B-4 | B-5 | B-6 | B-7 | B-8 |
| Resin solution for dispersing pigment | | | | | | | | |
| Kind | A-1 | A-1 | A-1 | A-1 | A-2 | A-2 | A-2 | A-2 |
| Amount | 181.8 | 181.8 | 181.8 | 181.8 | 181.8 | 181.8 | 181.8 | 181.8 |
| Pigment | | | | | | | | |
| RT 355D (Note 1) | 100 | | | | 100 | | | |
| G 314 (Note 2) | | 100 | | | | 100 | | |
| MT500HD (Note 3) | | | 200 | | | | 200 | |

TABLE 3-continued

| | Example | | | | | | | |
|---|---|---|---|---|---|---|---|---|
| | 10 | 11 | 12 | 13 | 14 | 15 | 16 | 17 |
| Raven 5000 UIII (Note 4) | | | | 20 | | | | 20 |
| N,N-dimethylaminoethanol | 0 | 0 | 0 | 0 | 1.1 | 1.1 | 1.1 | 1.1 |
| Deionized water | 327.2 | 327.2 | 327.2 | 327.2 | 327.2 | 327.2 | 327.2 | 327.2 |
| Test result | | | | | | | | |
| Coating film appearance | ○ | ○ | ○ | ○ | ○ | ○ | ○ | ○ |
| Gloss (60°) | 92 | 94 | 88 | 89 | 91 | 93 | 85 | 88 |
| Light transmission (%) | 90 | 92 | 85 | — | 91 | 91 | 78 | — |
| Viscosity (Pa · sec) | 1.3 | 1.5 | 1.2 | 1.5 | 1.3 | 1.6 | 1.4 | 1.2 |
| Yield point (dyn/cm$^2$) | 4.2 | 3.5 | 2.4 | 5.3 | 3.1 | 2.9 | 3.5 | 3.5 |

TABLE 4

| | Example | | | | | | | | | |
|---|---|---|---|---|---|---|---|---|---|---|
| | 12 | 13 | 14 | 15 | 16 | 17 | 18 | 19 | 20 | 21 |
| Pigment dispersion | BC-1 | BC-2 | BC-3 | BC-4 | BC-5 | BC-6 | BC-7 | BC-8 | BC-9 | BC-10 |
| Resin solution for dispersing pigment | | | | | | | | | | |
| Kind | AC-1 | AC-2 | AC-4 | AC-5 | AC-6 | AC-6 | AC-6 | AC-6 | AC-7 | AC-8 |
| Amount | 181.8 | 181.8 | 181.8 | 181.8 | 181.8 | 181.8 | 181.8 | 181.8 | 200 | 166.7 |
| Pigment | | | | | | | | | | |
| RT 355D (Note 1) | | | | | 100 | | | | | |
| G 314 (Note 2) | | | | | | 100 | | | | |
| MT500HD (Note 3) | | | | | | | 200 | | | |
| Raven 5000 UIII (Note 4) | 20 | 20 | 20 | 20 | | | | 20 | 20 | 20 |
| N,N-dimethylaminoethanol | 3.1 | 2.5 | 3.1 | 2.6 | 4.1 | 4.1 | 4.1 | 4.1 | 4.1 | 4.1 |
| Deionized water | 327.2 | 327.2 | 327.2 | 327.2 | 327.2 | 327.2 | 327.2 | 327.2 | 309 | 342.3 |
| Test result | | | | | | | | | | |
| Coating film appearance | X | Δ | Δ | Δ | Δ | Δ | Δ | Δ | Δ | X |
| Gloss (60°) | 71 | 76 | 78 | 74 | 84 | 82 | 72 | 78 | 83 | 72 |
| Light transmission (%) | — | — | — | — | 86 | 85 | 70 | — | — | — |
| Viscosity (Pa · sec) | 1.5 | 1.3 | 1.4 | 1.5 | 2.5 | 2.1 | 2.9 | 5.5 | 11.2 | 1.8 |
| Yield point (dyn/cm$^2$) | 5.8 | 4.2 | 3.9 | 5.9 | 8.5 | 7.9 | 8.5 | 11.5 | 39.1 | 3.9 |

TABLE 5

| | Example | | | | | | | Comparative Example | | | | |
|---|---|---|---|---|---|---|---|---|---|---|---|---|
| | 18 | 19 | 20 | 21 | 22 | 23 | 24 | 22 | 23 | 24 | 25 | 26 |
| Resin solution for dispersing pigment | | | | | | | | | | | | |
| Kind | A-3 | A-4 | A-5 | A-6 | A-7 | A-8 | A-9 | AC-9 | AC-10 | AC-11 | BYK-192 | TG-730 |
| Amount | 14.8 | 14.8 | 14.8 | 14.8 | 14.8 | 14.8 | 14.8 | 14.8 | 14.8 | 14.8 | 7.4 | 18.5 |
| Pigment; C. I. Pigment Black 7 | 4.3 | 4.3 | 4.3 | 4.3 | 4.3 | 4.3 | 4.3 | 4.3 | 4.3 | 4.3 | 4.3 | 4.3 |
| Deionized water | 70.9 | 70.9 | 70.9 | 70.9 | 70.9 | 70.9 | 70.9 | 70.9 | 70.9 | 70.9 | 78.3 | 67.2 |
| Test result | | | | | | | | | | | | |
| State of paste | ○ | ○ | ○ | ○ | ○ | ○ | ○ | Δ | Δ | Δ | X | X |
| Viscosity (Pa · sec) | 0.044 | 0.07 | 0.06 | 0.04 | 0.055 | 0.07 | 0.08 | 0.08 | 0.12 | 0.09 | 0.37 | 0.43 |
| Yield point (dyn/cm$^2$) | 1.7 | 3.5 | 3.5 | 1.5 | 1.7 | 3.2 | 3.6 | 4.6 | 5.2 | 3.7 | 4.9 | 5.3 |
| Blackness; B1 value | 50.3 | 48.1 | 48.5 | 52.3 | 46.6 | 46.2 | 46.5 | 10 | 0 | 0 | 21 | 15 |
| Gloss (60°) | 91 | 90 | 90 | 92 | 90 | 90 | 89 | 80 | 25 | 60 | 89 | 85 |

| | Example | | | | | | | Comparative Example | | | | |
|---|---|---|---|---|---|---|---|---|---|---|---|---|
| | 25 | 26 | 27 | 28 | 29 | 30 | 31 | 27 | 28 | 29 | 30 | 31 | 32 |
| Resin solution for dispersing pigment | | | | | | | | | | | | |
| Kind | A-3 | A-4 | A-5 | A-6 | A-7 | A-8 | AC-9 | AC-9 | AC-10 | AC-11 | BYK-182 | BYK-191 | S#20000 |
| Amount | 8.6 | 8.6 | 8.6 | 8.6 | 10 | 10 | 10 | 8.6 | 8.6 | 8.6 | 11.6 | 5 | 5 |

TABLE 5-continued

| | | | | | | | | | | | | | |
|---|---|---|---|---|---|---|---|---|---|---|---|---|---|
| Pigment; C. I. Pigment Blue 15:3 | 8.5 | 8.5 | 8.5 | 8.5 | | | | 8.5 | 8.5 | 8.5 | | | |
| Pigment; C. I. Pigment Red 122 | | | | | 10 | 10 | 10 | | | | 10 | 10 | 10 |
| BYK-028 | | | | | 1.2 | 1.2 | 1.2 | | | | 1.2 | 1.2 | 1.2 |
| Deionized water | 82.9 | 82.9 | 82.9 | 82.9 | 40 | 40 | 40 | 82.9 | 82.9 | 82.9 | 38.4 | 45 | 45 |
| Test result | | | | | | | | | | | | | |
| State of paste | ○ | ○ | ○ | ○ | ○ | ○ | ○ | Δ | Δ | Δ | Δ | Δ | Δ |
| Viscosity (Pa · sec) | 0.012 | 0.015 | 0.02 | 0.018 | 0.03 | 0.035 | 0.06 | 0.084 | 0.032 | 0.035 | 0.083 | 0.08 | 0.13 |
| Yield point (dyn/cm$^2$) | 1.3 | 1.3 | 1.5 | 1.7 | 2.2 | 2.2 | 7.1 | 1.96 | 10.5 | 1.8 | 8.1 | 7.3 | 57.4 |
| Gloss (60°) | 60.5 | 60.2 | 59.6 | 58.9 | 99 | 99 | 98 | 52.8 | 54 | 20.4 | 98 | 98 | 97 |

TABLE 6

| | Example | | | | | | | | | | |
|---|---|---|---|---|---|---|---|---|---|---|---|
| | 32 | 33 | 34 | 35 | 36 | 37 | 38 | 39 | 40 | 41 | 42 |
| Resin solution for dispersing pigment | | | | | | | | | | | |
| Kind | A-3 | A-4 | A-5 | A-6 | A-7 | A-8 | A-9 | A-3 | A-4 | A-5 | A-6 |
| Amount | 10 | 10 | 10 | 10 | 10 | 10 | 10 | 10 | 10 | 10 | 10 |
| Pigment; G-314 | 10 | 10 | 10 | 10 | 10 | 10 | 10 | 10 | 10 | 10 | 10 |
| AC-10 | 30 | 30 | 30 | 30 | 30 | 30 | 30 | 30 | | 30 | 30 |
| PP-1 | | | | | | | | | 42.8 | | |
| Aminomethyl propanol | 0.9 | 0.9 | 0.9 | 0.9 | 0.9 | 0.9 | 0.9 | 0.9 | 0.9 | 0.9 | 0.9 |
| Deionized water | 57.3 | 57.3 | 57.3 | 57.3 | 57.3 | 57.3 | 57.3 | 92.5 | 79.6 | 92.5 | 92.5 |
| Test result | | | | | | | | | | | |
| State of paste | ○ | ○ | ○ | ○ | ○ | ○ | ○ | ○ | ○ | ○ | ○ |
| Light transmission (%) | 100 | 100 | 100 | 100 | 100 | 100 | 100 | 98.5 | 98.4 | 97.8 | 98.2 |
| L* | 2.1 | 2.2 | 2.5 | 2 | 2.6 | 2.6 | 2.8 | 2.8 | 2.9 | 3.2 | 2.9 |
| a* | 7.3 | 7.3 | 7.8 | 7.1 | 8.6 | 8.5 | 8.9 | 9 | 8.7 | 9.1 | 9.2 |
| b* | −19.1 | −19.6 | −20.3 | −19.5 | −21.6 | −21.2 | −22.3 | −21.7 | −22.3 | −23.5 | −20.5 |

| | Comparative Example | | | |
|---|---|---|---|---|
| | 33 | 34 | 35 | 36 |
| Resin solution for dispersing pigment | | | | |
| Kind | S#20000 | BYK191 | A-3 | A-3 |
| Amount | 5 | 5 | 10 | 10 |
| Pigment; G-314 | 10 | 10 | 10 | 10 |
| AC-10 | 30 | 30 | 30 | |
| PP-1 | | | | 42.8 |
| Aminomethyl propanol | 0.9 | 0.9 | 0.9 | 1 |
| Deionized water | 57.3 | 57.3 | 92.5 | 79.6 |
| Test result | | | | |
| State of paste | X | Δ | X | X |
| Light transmission (%) | 84.7 | 80.4 | 85.3 | 81.9 |
| L* | 6.2 | 5 | 5 | 6.2 |
| a* | 16.4 | 15.5 | 10.5 | 15.3 |
| b* | −29.8 | −29.9 | −27.4 | −30.5 |

Synthesis of Base Resin for Paint

Synthesis Example 2

A reaction vessel for producing acrylic resins, equipped with a stirrer, thermometer and a reflux condenser was charged with 40 parts of ethylene glycol monobutyl ether and 30 parts of isobutyl alcohol, which were heated under stirring. When the temperature of the system reached 100° C., a mixture of the following monomers was added to the system dropwise, over a period of 3 hours:

| | |
|---|---|
| Styrene | 10 parts |
| Methyl methacrylate | 38 parts |
| n-Butyl acrylate | 25 parts |
| 2-Hydroxyethyl methacrylate | 20 parts |
| Acrylic acid | 7 parts |
| 2,2'-Azobisisobutyronitrile | 1 part |

After the dropwise addition was completed, the system was maintained at 100° C. for further 30 minutes, and thereafter an additional catalytic solution which was a mixture of 0.5 part of 2,2'-azobisisobutyronitrile and 10 parts of ethylene glycol monobutyl ether was added dropwise, consuming an hour, followed by further an hour's stirring at 100° C. and cooling. Subsequently, 15 parts of isobutylalcohol was added, and, when the temperature of the resulting mixture became 75° C., 4 parts of N,N-dimethylamino ethanol was added, and the resultant mixture was stirred for 30 minutes to give an acrylic resin solution (AP-1) having a solid concentration of 50%. The obtained resin had an acid value of 54 mgKOH/g, a hydroxyl value of 86 mgKOH/g and a weight average molecular weight of 32,000.

Synthesis Example 3

A reaction vessel equipped with a stirrer, thermometer, rectification column and nitrogen inlet pipe was charged with 317.8 parts of isophthalic acid, 196.5 parts of hexahydrophthalic acid, 372.6 parts of adipic acid, 268 parts of neopentyl glycol, 217.8 parts of 1,6-hexanediol and 263.5 parts of trimethylolpropane, which were heated under stirring while nitrogen gas was introduced. After the temperature reached 160° C., the system was gradually heated to 235° C. over a period of 3 hours, followed by 1.5 hours' aging. Thereafter the rectification column was switched to reflux condenser, and the reaction was conducted after introduction of 100 parts of toluene, under reflux. The reaction was continued for 6 hours at 235° C., and thereafter the toluene was removed under reduced pressure. The system was cooled to 170° C., followed by addition of 122.5 parts of trimellitic anhydride and 30 minutes' aging at 170° C. Further 322 parts of butyl cellosolve was added, and the system was thereafter cooled to 80° C., 4 parts of N,N-dimethylaminoethanol was added, and the system was allowed to stand at 80° C. for 30 minutes, followed by cooling to 50° C., addition of 2600 parts of deionized water and 30 minutes' stirring. Thus a polyester resin (PP-2) solution having a solid concentration of 50% was obtained. The obtained resin had an acid value of 56 mgKOH/g, a hydroxyl value of 90 mgKOH/g and a weight average molecular weight of 25,000.

Synthesis Example 4

A reaction vessel for producing acrylic resins, equipped with a stirrer, thermometer and a reflux condenser was charged with 400 parts of deionized water and 2.4 parts of Newcol™ 562SF (Nippon Nyukazai Co., Ltd., a surfactant), which were heated under stirring. When the temperature reached 82° C., a pre-emulsion forming mixture was charged, which had been prepared by mixing 6 parts of styrene, 8.5 parts of n-butyl acrylate, 0.5 part of allyl methacrylate, 0.175 part of Newcol™ 562SF and 7.5 parts of deionized water and stirring the mixture with disper at about 1000 r.p.m. for 10 minutes. Twenty (20) minutes after charging said pre-emulsion forming mixture, 15 parts of deionized water and 0.54 part of potassium persulfate were added. After further 10 minutes, while the system was still maintained at 82° C., a first monomeric mixture formed by mixing 114 parts of styrene, 161.5 parts of n-butyl acrylate, 9.5 parts of allyl methacrylate, 3.325 parts of Newcol™ 562SF and 142.5 parts of deionized water, stirring the mixture with a disper at about 1,000 r.p.m. for 10 minutes and adding thereto 15 parts of deionized water and 0.54 part of potassium persulfate, was added dropwise over a period of 3 hours. Then after intervening standing at 82° C. for 30 minutes, a second monomeric mixture formed by mixing 50 parts of styrene, 23 parts of n-butyl acrylate, 10 parts of 2-hydroxyethyl acrylate, 5 parts of methacrylic acid, 1.6 parts of Newcol™ 562SF and 60 parts of deionized water, stirring the mixture with a disper at about 1,000 r.p.m. for 10 minutes and adding thereto 15 parts of deionized water and 0.54 part of potassium persulfate, was added dropwise over a period of 1.5 hours. After the addition, the system was maintained at 82° C. for 30 minutes, cooled, and when the temperature dropped to 75° C., a mixture of 7 parts of N,N-dimethylamionoethanol and 280 parts of deionized water was added dropwise over 15 minutes, followed by 15 minutes' standing at 75° C. Upon further cooling, an acrylic emulsion having a solid concentration of 30% was synthesized.

Preparation of Colored Paint Composition

Example 43

There were mixed 132.2 parts water-based pigment dispersion (B-1) as a pigment dispersion paste (30 parts as solid) which had been prepared in Example 10, 30 parts (15 parts as solid) of the acrylic polymer (AP-1) solution formed in Synthesis Example 2, 42.9 parts (15 parts as solid) of the polyester polymer (PP-2) formed in Synthesis Example 3, 37.5 parts (30 parts as solid) of Cymel™ 325 (Mitsui Cytec Co., Ltd., a methyl etherified melamine resin solution having a solid content of about 80%), 50 parts (15 parts as solid) of the acrylic emulsion formed in Synthesis Example 4, and further 1 part of 28% Primal™ ASE (which had been formed by diluting "gPrimal™ ASE-60", a thickener manufactured by Japan Acryl Chemicals Co., Ltd., with water to a solid content of 28%), 0.8 part of dimethylethanol amine, 230 parts of deionized water and 30 parts of 2-ethylhexyl alcohol, and, thus, there was obtained a colored paint composition having a viscosity of 500 mPa·s. (measured with B-type viscometer at 60 r.p.m.) and a pH of about 8.5.

Examples 44 to 45 and Comparative Examples 37 to 43

Example 43 was repeated except that the formulation of components was varied for each run as shown in Table 7 which is mentioned later, and, thus, there were obtained colored paint compositions.

Using those paint compositions obtained in Examples 43 to 45 and Comparative Examples 37 to 43, test panels were prepared by the following method.

Preparation of Test Panels

A 0.8 mm-thick cold rolled dull steel sheet which had been chemically treated with zinc phosphate was applied with an epoxy resin-based cationic electrodeposition paint to a dry film thickness of about 20 μm which was subsequently baked. Onto this electrodeposited paint film, automotive polyester resin-based inter coating paint was applied to a dry film thickness of about 20 μm and baked. This coated steel sheet was wet-sanded with #400 sand paper, dried off and degreased with petroleum benzin. Onto so degreased coat surface, each of the coloring paint compositions whose viscosity had been adjusted to 500 mPa·s (measured with B-type viscometer at 60 r.p.m.) was applied with minibell rotation type electrostatic coater at a booth humidity of 70%, to a dry film thickness of about 15 μm, and allowed to stand at room temperature for about 5 minutes for setting. Each of the paint film was baked with an electric hot air dryer at 80° C. for 10 minutes to evaporate off most of volatile components. Then, the film was left to stand still in room to be cooled, and, subsequently, was coated with an automotive acrylic resin-based clear paint, "Magicron™ TC71" (manufactured by Kansai Paint Co., Ltd.) to a dry film thickness of about 40 μm, followed by baking with an electric hot air dryer at 140° C. for 30 minutes, and, thus, test panels were prepared.

Thus prepared test panels were subjected to various performance tests by the following test methods, with the results as given in Table 7 which is mentioned later.

Test Methods

Appearance of Coat Finish:

The appearance of coat finish was synthetically examined in respect of gloss and fatness, and evaluated according to the following criteria:

○: good; Δ: poor; X: very poor.

Gloss

Following JIS K5400 7.6 (1990), 60°-specular gloss of each coated film was measured.

Sharpness:

Sharpness was measured with a portable gloss distinctness meter P.G.D-IV (Japan Color Research Institute). The higher the measured value is, the better is the sharpness.

Intimate Adhesion:

Following JIS K-5400 8.5.2 (1990) lattice pattern tape method, each eleven parallel straight lines were orthogonally drawn vertically and horizontally at 1 mm intervals on the top coat film surface on each test panel, to form one hundred 1 mm×1 mm squares. Onto the same surface cellophane adhesive tape was applied intimately. The tape was then rapidly peeled off, and the extent of peeling of the squares was observed. Evaluation of adhesion was made according to the following criteria:

○: at least 90 squares of the coat film remained unpeeled;
Δ: no less than 50 but less than 90 squares emained unpeeled;
X: less than 50 squares remained unpeeled.

Acid Resistance:

An artificial rain (0.5 cc) of the following composition was dropped onto each of the test panels which were heated on 80° C. hot plate for 30 minutes and then washed with water. The coated surfaces were visually examined and evaluated according to the following grading standards:

○: no change observed on the coated surface;
Δ: no whitening or swelling observed on the coated surface, but difference in level was recognized at the boundaries;
X: whitening or swelling observed on the coated surface.

The artificial rain used was a blend of 19.6 g of 1 mg/g aqueous solution of $NaNO_3$; 5.2 g of 1 mg/g aqueous $KNO_3$ solution,; 3.7 g of 1 mg/g aqueous solution of $CaCl_2 \cdot 2H_2O$,; 8.2 g of 1 mg/g aqueous solution of $MgSO_4 \cdot 7H_2O$; 73.3 g of 1 mg/g aqueous solution of $(NH_4)_2 SO_4$,; 30.0 g of 0.1 N aqueous solution of $H_2SO_4$; 20.0 g of 0.1 N aqueous solution of $HNO_3$; 10.0 g of 0.05N aqueous solution of HCl, and 4.7 g of 1 mg/g aqueous solution of NaF. The pH of the blend was adjusted to 1.0 with $H_2SO_4$.

Solvent Resistance:

In a 20° C. room, each test panel surface was rubbed with a piece of cotton gauze soaked with methyl ethyl ketone under about 1 kg/cm² load over a length of about 5 cm. After 50 times reciprocal rubbing, the surface condition of the test panel was visually graded according to the following standard:

○: no change observed on the coated surface;
Δ: scratches observed on the coated surface; and
X: whitening or swelling observed on the coated surface.

Impact Resistance:

Following JIS K-5400 8.3.2 (1990) DuPont impact resistance test, a weight of 500 g with its hitting front end having a diameter of about 12.7 mm was dropped on the coated film surface facing upward, and, thus, the maximum height of weight was measured as far as no damage was made on the coating film. The maximal value is 50 cm.

TABLE 7

|  | Example | | | Comparative Example | | | | | | |
| --- | --- | --- | --- | --- | --- | --- | --- | --- | --- | --- |
|  | 43 | 44 | 45 | 37 | 38 | 39 | 40 | 41 | 42 | 43 |
| Pigment dispersing paste |  |  |  |  |  |  |  |  |  |  |
| Kind | B-1 | B-4 | B-8 | BC-1 | BC-2 | BC-3 | BC-4 | BC-8 | BC-9 | BC-10 |
| Amount |  | 132.2 |  |  |  |  | 132.2 |  |  |  |
| Acryl polymer solution |  |  |  |  |  |  |  |  |  |  |
| Kind | AP-1 | AP-1 | AP-1 | AP-1 | AP-1 | AP-1 | AP-1 | AP-1 | AP-1 | AP-1 |
| Amount |  | 30 |  |  |  |  | 30 |  |  |  |
| Polyester polymer solution |  |  |  |  |  |  |  |  |  |  |
| Kind | PP-2 | PP-2 | PP-2 | PP-2 | PP-2 | PP-2 | PP-2 | PP-2 | PP-2 | PP-2 |
| Amount |  | 42.9 |  |  |  |  | 42.9 |  |  |  |
| Acryl emulsion of Synthesis Example 4 |  | 66.7 |  |  |  |  | 66.7 |  |  |  |
| Cymel 325 |  | 37.5 |  |  |  |  | 37.5 |  |  |  |
| 28% Primal ASE-60 |  | 1.0 |  |  |  |  | 1.0 |  |  |  |
| N,N-dimethylamino ethanol |  | 0.8 |  |  |  |  | 0.8 |  |  |  |
| Dionized water |  | 213.9 |  |  |  |  | 213.9 |  |  |  |
| Coating film performance |  |  |  |  |  |  |  |  |  |  |
| Coating film appearance | ○ | ○ | ○ | X | X | X | X | Δ | Δ | X |
| 60°Gloss | 87 | 84 | 85 | 62 | 66 | 69 | 67 | 72 | 72 | 64 |

TABLE 7-continued

|  | Example | | | Comparative Example | | | | | | |
| --- | --- | --- | --- | --- | --- | --- | --- | --- | --- | --- |
|  | 43 | 44 | 45 | 37 | 38 | 39 | 40 | 41 | 42 | 43 |
| Sharpness | 1.2 | 1.2 | 1.2 | 0.5 | 0.7 | 0.7 | 0.8 | 0.9 | 0.9 | 0.7 |
| Intimate adhesion | ○ | ○ | ○ | Δ | Δ | Δ | Δ | Δ | Δ | Δ |
| Acid resistance | ○ | ○ | ○ | Δ | Δ | Δ | Δ | Δ | Δ | Δ |
| Solvent resistance | ○ | ○ | ○ | Δ | Δ | Δ | Δ | Δ | Δ | Δ |
| Impact resistance | 50 | 50 | 50 | 30 | 35 | 35 | 30 | 35 | 30 | 30 |

INDUSTRIAL APPLICABILITY

The use of the water-based pigment dispersing resins of this invention provides water-based pigment dispersions which excel in wetting property and dispersing stability even at high pigment concentration, and which have low viscosity and are excellent in color developing property and weatherability. The use of said water-based pigment dispersions in turn gives a coating composition which excels not only in pigment color-developing property and in coating film performance such as coating film appearance, weatherability and physical properties, but also in pigment dispersing stability, and which can be made to contain pigment at a high concentration. The use of said water-based pigment dispersions also gives a water-based ink composition which is excellent not only in pigment color-developing property and dispersing stability but also in sharpness, transparency and color developing property.

The invention claimed is:

1. Water-based pigment dispersion which comprises a pigment dispersing resin, pigment and aqueous medium, said resin being a copolymer of:
   A) polymerizable unsaturated monomer containing at least one quaternary ammonium salt group;
   B) nonionic polymerizable unsaturated monomer having polyoxyethylene chain; and
   C) other ethylenically unsaturated monomer, wherein the copolymer is produced by the copolymerization of 1 to 15% by weight of quaternary ammonium salt group-containing polymerizable unsaturated monomer (A), 5 to 40% by weight of nonionic polymerizable unsaturated monomer (B) and 45 to 94% by weight of other ethylenically unsaturated monomer (C) on the basis of the total weight of monomers (A), (B) and (C).

2. A water-based coating composition which comprises the water-based pigment dispersion of claim 1.

3. A water-based coating composition of claim 2 which is top-coating coloring paint for automobile.

4. An article which has been coated with the water-based coating composition of claim 2.

5. A water-based ink composition which comprises the water-based pigment dispersion of claim 1.

6. The water-based ink composition of claim 5 which is ink for ink-jet printer.

7. A print which has been printed by the water-based ink composition of claim 5.

8. The pigment dispersing resin of claim 1 wherein the quaternary ammonium group-containing polymerizable unsaturated monomer (A) is selected from the group consisting of 2-(methacryloyloxy)ethyl trimethylammonium chloride, 2-(methacryloyloxy)ethyl trimethylammonium bromide, (meth)acryloylaminopropyl trimethylammonium chloride, (meth)acryloylaminopropyl trimethylammonium bromide, tetrabutylammonium(meth)acrylate, trimethylbenzylammonium (meth)acrylate and 2-(methacryloyloxy)ethyl trimethylammonium dimethylphosphate.

9. The pigment dispersing resin of claim 1 wherein the quaternary ammonium group-containing polymerizable unsaturated monomer (A) is 2-(methacryloyloxy)ethyltrimethylammonium chloride.

10. The pigment dispersing resin of claim 1 wherein the quaternary ammonium group-containing polymerizable unsaturated monomer (A) comprises a combination of quaternary ammonium salt group-containing polymerizable unsaturated monomer and tertiary amino group-containing polymerizable unsaturated monomer.

11. The pigment dispersing resin of claim 10 wherein tertiary amino group-containing polymerizable unsaturated monomer is selected from the group consisting of N,N-dialkylaminoalkyl (meth)acrylate and N,N-dialkylaminoalkyl (meth)acrylamide.

12. The pigment dispersing resin of claim 10 wherein the quaternary ammonium group-containing polymerizable unsaturated monomer (A) comprises a combination of 2-(methacryloyloxy)ethyltrimethylammonium chloride and either N,N-dimethylaminoethyl(meth)acrylate or N,N-diethylaminoethyl(meth)acrylate.

13. The pigment dispersing resin of claim 1 wherein nonionic polymerizable unsaturated monomer (B) is compound of the following formula (1):

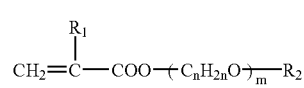

(1)

in which
R$_1$ stands for hydrogen or CH$_3$,
R$_2$ stands for hydrogen or alkyl group having one to four carbon atoms,
m is an integer of 4–60, and
n is an integer of 2,
and wherein oxyalkylene units (C$_n$H$_{2n}$O) in the number of m may be the same or different from each other.

14. The pigment dispersing resin of claim 1 wherein nonionic polymerizable unsaturated monomer (B) is polyethylene glycol (meth)acrylate.

15. The pigment dispersing resin of claim 1 wherein other ethylenically unsaturated monomer (C) contains a hydroxyl group-containing polymerizable unsaturated monomer at least as a part of its component.

16. The pigment dispersing resin of claim 1 wherein other ethylenically unsaturated monomer (C) contains a carboxyl group-containing polymerizable unsaturated monomer at least as a part of its component.

17. The pigment dispersing resin of claim 1 wherein the copolymer has a weight average molecular weight within a range of 500 to 100,000.

* * * * *